United States Patent
Sonnak

(10) Patent No.: US 6,315,274 B1
(45) Date of Patent: Nov. 13, 2001

(54) PNEUMATIC SUSPENSION SYSTEM

(75) Inventor: Ulrich Sonnak, Hamburg (DE)

(73) Assignee: Phoenix Aktiengesellschaft, Hamburg (DE)

(*) Notice: Subject to any disclaimer, the term of this patent is extended or adjusted under 35 U.S.C. 154(b) by 0 days.

(21) Appl. No.: 09/381,789
(22) PCT Filed: Sep. 18, 1998
(86) PCT No.: PCT/DE98/02773
§ 371 Date: Sep. 22, 1999
§ 102(e) Date: Sep. 22, 1999
(87) PCT Pub. No.: WO99/15808
PCT Pub. Date: Apr. 1, 1999

(30) Foreign Application Priority Data

Sep. 25, 1997 (DE) ............................................ 197 42 245

(51) Int. Cl.⁷ ...................................................... F16F 9/04
(52) U.S. Cl. ..................................... 267/64.27; 267/64.19; 267/122
(58) Field of Search ............................... 267/122, 64.27, 267/64.23, 64.24, 64.21, 64.19; 188/267, 298

(56) References Cited

U.S. PATENT DOCUMENTS

| 3,850,437 | * | 11/1974 | Owen | 287/64.21 |
| 4,310,172 | * | 1/1982 | Claude et al. | 280/703 |
| 4,718,650 | * | 1/1988 | Geno | 267/64.27 |
| 4,722,516 | | 2/1988 | Gregg | 267/64.27 |
| 5,267,725 | * | 12/1993 | Wode et al. | 267/64.27 |

FOREIGN PATENT DOCUMENTS

| 1 908 373 | | 9/1970 | (DE) . |
| 2 064 751 | | 8/1972 | (DE) . |
| 3643073 | | 6/1988 | (DE) . |
| 4300906 | * | 7/1994 | (DE) . |
| 0 295 392 | | 12/1988 | (EP) . |
| 2 093 448 | | 1/1972 | (FR) . |
| 0166702 | * | 1/1986 | (IT) . |
| 55076237 | | 6/1980 | (JP) . |
| 01182642 | | 7/1989 | (JP) . |

* cited by examiner

Primary Examiner—Robert J. Oberleitner
Assistant Examiner—Mariano Sy
(74) Attorney, Agent, or Firm—Collard & Roe, P.C.

(57) ABSTRACT

The invention concerns a pneumatic suspension system (1) comprising at least an elastomer bellows (2) provided with reinforcement linings, a cover (5) with a bottom zone (A) whereon is fixed, by means of a clamp ring or the like (3), the bellows (2) top end (2'), a median zone (B) and a top zone (C) which, simultaneously, is assembled with a connecting component, in particular a component integral with the body, and a pneumatic piston (6) whereon is fixed the bellows (2) bottom end (2"), also by means of a clamp ring (3') or the like, and on whose external wall the bellows can roll. The invention is charaterized in that the system is provided with a pleated structure enclosing in the form of a ring the cover (5) thereby elastically supporting the pleated structure (4) formed in the bellows (2) top end zone, and the pleated structure bearing surface is, once more, supported on a part, which is either part of the cover, or a connecting component, or an auxiliary component.

12 Claims, 4 Drawing Sheets

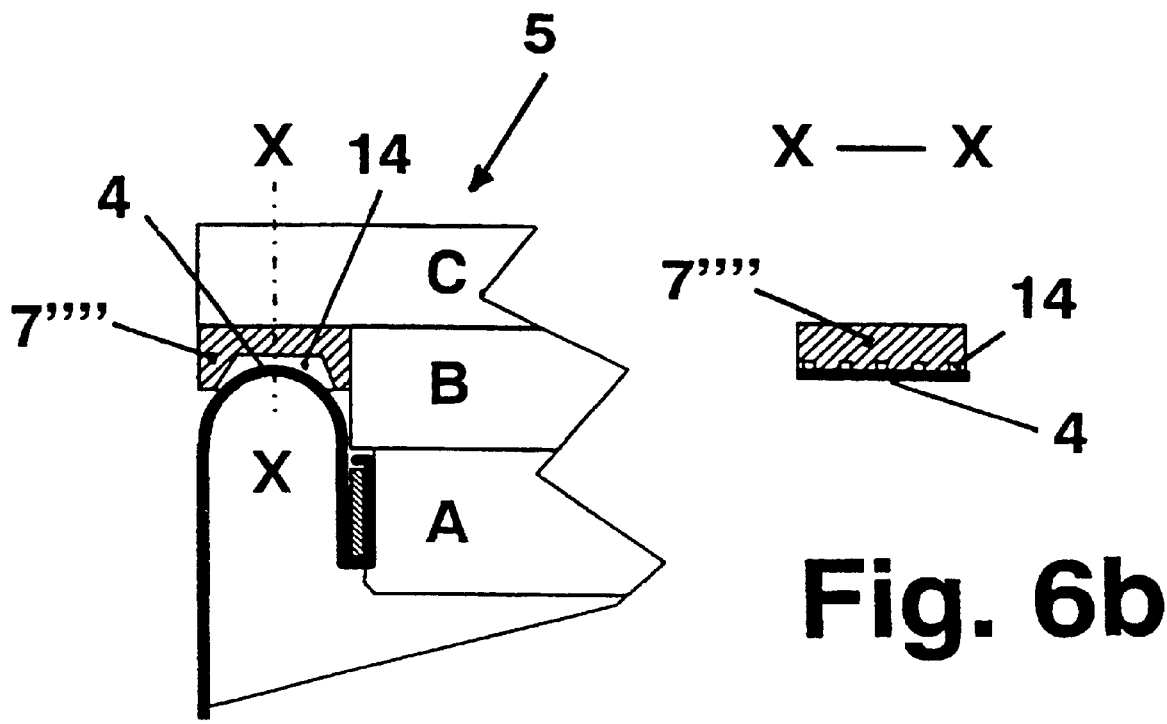

PNEUMATIC SUSPENSION SYSTEM

DESCRIPTION

The invention relates to a pneumatic suspension system consisting of at least one bellows made of elastomer material and provided with reinforcement linings, if need be;

a cover comprising a lower zone, on which the upper end of the bellows is secured by means of a clamping ring or the like, a median zone, and an upper zone which is connected at the same time with a connecting component, in particular with a structural component integral with the body of the vehicle; as well as a pneumatic piston, on which the bottom end of the bellows is secured by means of a clamping ring or the like as well, with the pneumatic bellows being capable of rolling off on the outer wall of said piston.

Such a pneumatic suspension system is described, for example in published document DE-A-36 43 073.

Based on the prior art of a pneumatic suspension system outlined above, the present problem is to elastically support the milling forces generated in connection with the elastic movement of pneumatic bellows, and to isolate such forces from the body of the vehicle or other structural components in such a way that the driving comfort is enhanced.

Now, said problem is solved according to the characterizing part of patent claim 1 in that the pneumatic suspension system is equipped with a pleated structure bearing extending around the pneumatic cover in the form of a ring within its median zone, whereby the rolling pleat developing within the zone of the top end of the pneumatic bellows is elastically supported on said pleated structure bearing, and whereby the pleated structure bearing is in turn supported on a structural component, the latter being a part element of the pneumatic cover, a connecting component, or an additional structural component.

Useful embodiments of the pneumatic suspension system as defined by the invention are specified in claims 2 to 13.

Now, the invention is explained in greater detail with the help of exemplified embodiments and with reference to schematic drawings, in which:

FIG. 6a shows a pleated structure bearing with pockets; and

FIG. 6b shows a pleated structure bearing with pockets acceding to section X—X (FIG. 6a).

Figure 1:
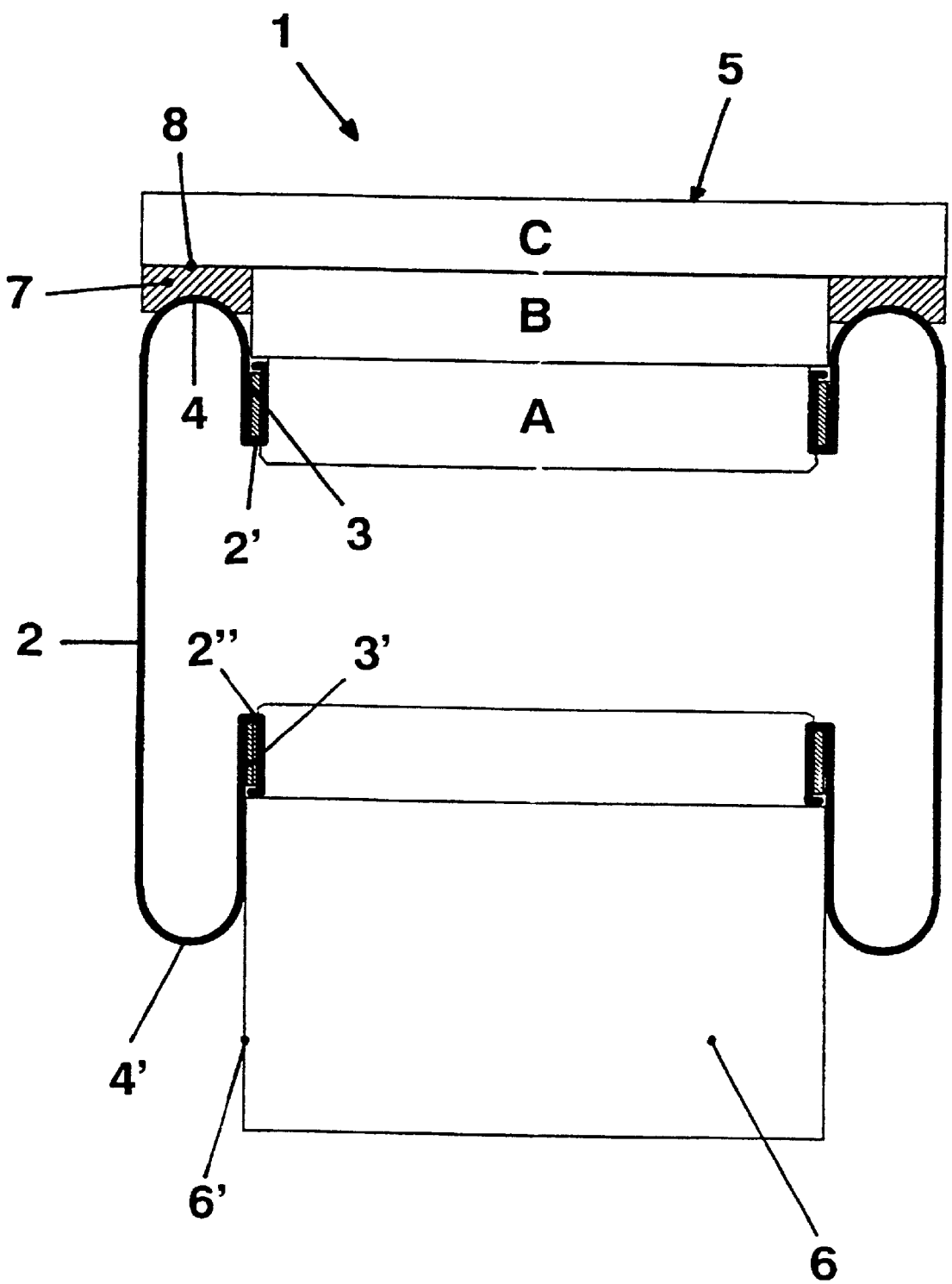
FIG. 1 shows a pneumatic suspension system with a pleated structure bearing.

The following list of reference numerals and symbols applies in association with said figures:

| | |
|---|---|
| 1 = | Pneumatic suspension system |
| 2 = | Pneumatic bellows |
| 2' = | Top end of the pneumatic bellows (beaded over) |
| 2" = | Bottom end of the pneumatic bellows (beaded over) |
| 3 = | Clamping ring |
| 3' = | Clamping ring |
| 3" = | Clamping ring |
| 4 = | Pleated structure (top) |
| 4' = | Pleated structure (bottom) |
| 5 = | Pneumatic cover with the following zones: |
| | A (bottom zone; zone where the pneumatic bellows is secured) |
| | B (median zone; main zone of the pleated structure bearing) |
| | C (top zone; zone of connection with the connecting component) |
| 6 = | Pneumatic piston |
| 6' = | External wall of the pneumatic piston (= roll-off surface) |
| 7 = | Pleated structure bearing |
| 7' = | Pleated structure bearing |
| 7" = | Pleated structure bearing |
| 7''' = | Pleated structure bearing |
| 7'''' = | Pleated structure bearing |
| 8 = | Free underside of the top zone of the pneumatic cover |
| 8' = | Free underside of the structural component integral with the body |
| 9 = | Support surface |
| 10 = | Support ring (joined with clamping ring as one piece) |
| 10' = | Support ring (separate structural component) |
| 11 = | Support surface of support ring |
| 11' = | Support surface of support ring |
| 12 = | Flange-shaped widening |
| 13 = | Free space |
| 13' = | Free space |
| 14 = | Pockets |

FIG. 1 shows the important structural components of pneumatic suspension system 1, whereby the ambient field of pneumatic cover 5 is of special importance within the framework of the invention. Pneumatic covers can be designed in different ways depending on the design specifications; however, such covers can be divided schematized in the following three zones A, B and C, which are explained in the following in association with the exemplified embodiment according to FIG. 1.

Zone A: Within this bottom zone, the upper end 2' of pneumatic bellows 2 made of elastomer material is secured with the help of clamping ring 3 and at the same time beaded around the pneumatic bellows. The clamping ring consists of metal in most cases.

Zone B: Within this median zone, pleated structure bearing 7 extends around pneumatic cover 5 in the form of a ring. The pleated structure 4 developing within the zone of the top end of the pneumatic bellows is now elastically supported by the pleated structure bearing 7.

Zone C: This top zone is in connection with a connecting structural component, in particular with a structural component integral with the body. Here, pleated structure bearing 7 is directly supported on the free underside 8 of the top zone of pneumatic cover 5.

Pneumatic piston 6 is another structural component of pneumatic suspension system 1, on which the lower end 2" of pneumatic bellows 2 is secured by means of a clamping ring 3' as well, beaded at the same time around the end of the pneumatic bellows. The latter is now capable of rolling off on the external wall of the pneumatic piston, forming the pleated structure 4'.

Now, FIGS. 2 to 5 show different variations for supporting the pleated structure bearing.

Figure 2:
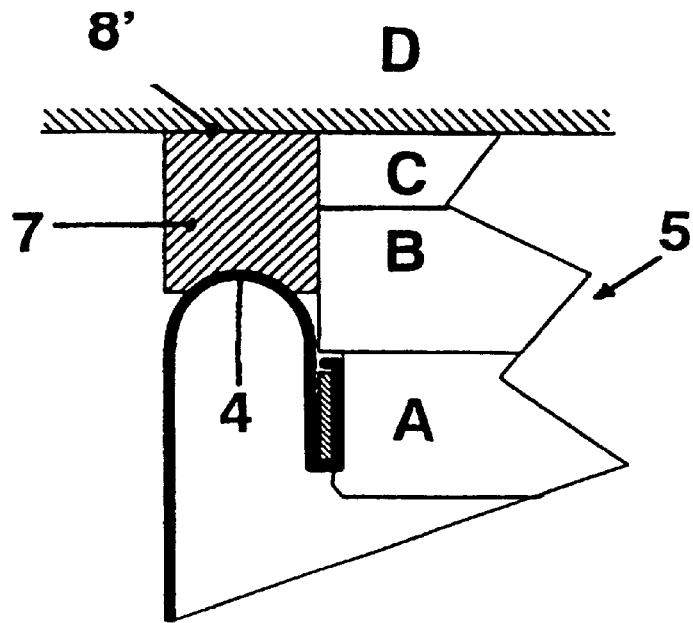
FIG. 2 shows a pleated structure bearing supported on the free underside of the structural component integral with the body.

According to FIG. 2, pleated structure bearing 7 is directly supported on the free underside 8' of structural component D, which is integral with the body.

Figure 3:
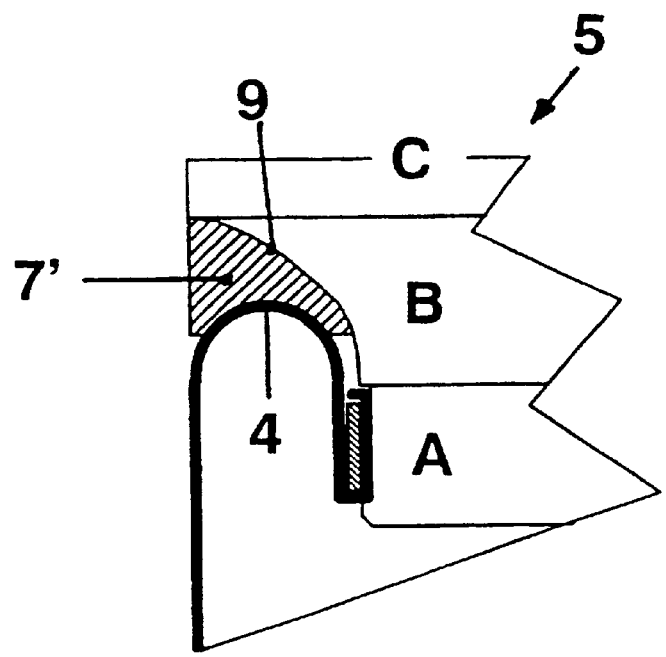
FIG. 3 shows a pleated structure bearing supported on a specially shaped support surface within the median zone of the pneumatic cover.

In the variation according to FIG. 3, pleated structure bearing 7' is supported on a specially shaped support surface 9 within the median zone B of pneumatic cover 5, whereby the support surface preferably changes free of edges into the top zone C of the pneumatic cover in the form of a concave outer contour.

Figure 4:
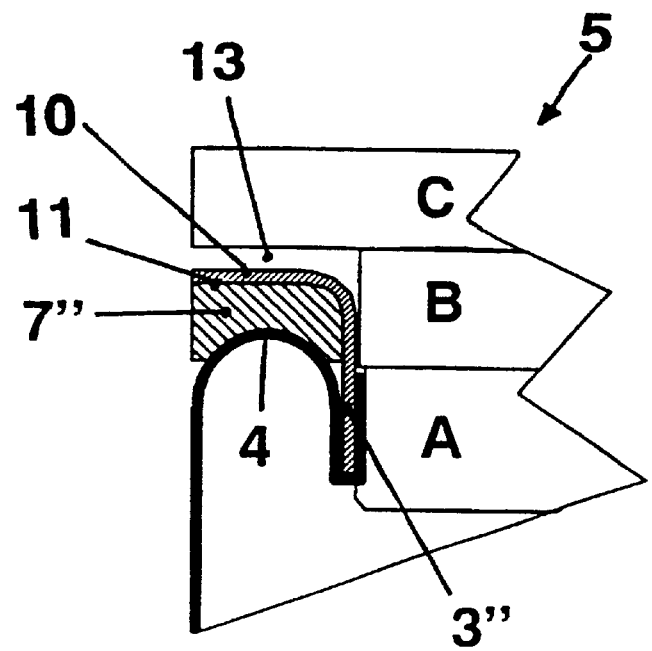
FIG. 4 shows a pleated structure bearing with a support ring forming a one-piece structural component with the clamping ring.

Now, FIG. 4 shows an exemplified embodiment in which the pleated structure bearing 7" is supported by means of an additional structural component in the form of a support ring 10 extending around pneumatic cover 5 within median zone B of the latter. Support ring 10 and clamping ring 3" jointly form a one-piece, angularly shaped structural component, whereby the support ring or its bearing surface 11 substantially extend parallel with top zone C of pneumatic cover 5. A free space 13 is available between support ring 10 and zone C, which contributes to additional suspension.

Figure 5:
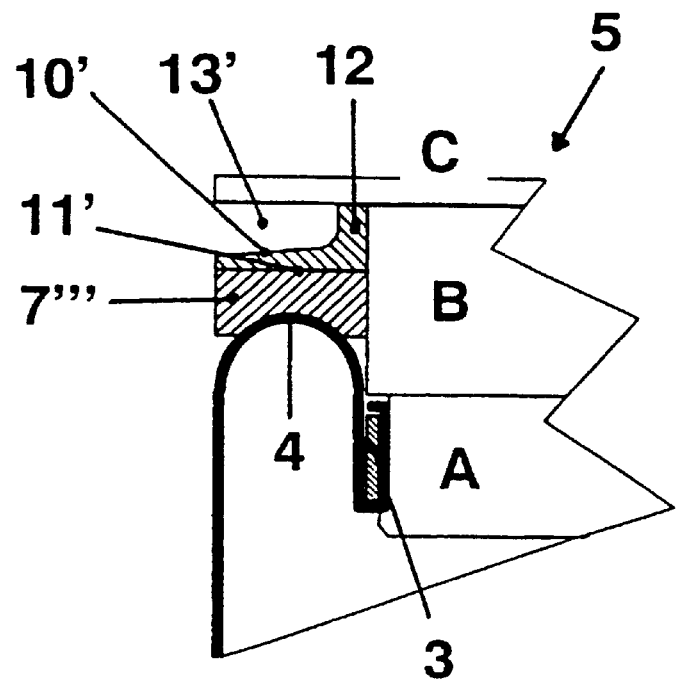
FIG. 5 shows a pleated structure bearing with a separate support ring.

According to FIG. 5, support ring 10' for pleated structure bearing 7'" is a separate structural component with respect to clamping ring 3, whereby bearing surface 11' of the support ring extends substantially parallel with the top zone C of pneumatic cover 5, namely in association with a flange-shaped widening 12 toward median zone B of the pneumatic cover. Here, too, a free space 13' is present between support ring 10' and zone C.

Now, FIG. 6a shows a pleated structure bearing 7"" having the pockets 14 facing the pleated structure 4, said pockets in particular being arranged at regular spacings and completely extending around the pleated structure bearing in the direction of the ring (FIG. 6b). The stiffness of the pleated structure bearing is influenced in this way in an advantageous way.

The pleated structure bearing is installed within the framework of conventional measures such as insertion, gluing or vulcanizing.

The pleated structure beating is installed within the framework of conventional measures such as insertion, gluing or vulcanizing.

What is claimed is:

1. A pneumatic suspension system comprising:
   one pneumatic bellows (2) made of elastomeric material, said bellows being provided with reinforcing linings;
   one pneumatic cover (5) comprising: a bottom zone (A), on which a top end (2') of the pneumatic bellows (2) is secured by a clamping ring (3); a median zone (B); and a top zone (C) connected to a connecting component or a structural component (D) being integrated therein;
   one pneumatic piston (6) secured to a bottom end (2") of the pneumatic bellows (2) by a clamping ring (3'), wherein the pneumatic bellows can roll off on an external wall (6') of the pneumatic piston; and
   a pleated structure bearing (7, 7', 71", 7'", 7"") enclosing the pneumatic cover (5) exclusively within the median zone (B) of said cover, said pleated structure bearing comprising a ring for elastically supporting a pleated structure (4) developing within the top zone of the pneumatic bellows (2), wherein the pleated structure bearing is supported on said structural component being a part element of the pneumatic cover, said connecting or structural component or an additional structural component.

2. The pneumatic suspension system according to claim 1, characterized in that the pleated structure bearing (7) is directly supported on a free underside (8) of the top zone (c) of the pneumatic cover (5).

3. The pneumatic suspension system according to claim 1, characterized in that the pleated structure bearing (7') is supported on a specially shaped support surface (9) within the median zone (B) of the pneumatic cover (5), whereby the support surface changes free of edges and in the form of a concave outer contour into the top zone (C) of the pneumatic cover (5).

4. The pneumatic suspension system according to claim 1, characterized in that the pleated structure bearing (7", 7'") is supported on a support ring (10, 10') enclosing the pneumatic cover (5) within its median zone (B).

5. The pneumatic suspension system according to claim 4, characterized in that the support ring (10) and the clamping ring (3") jointly form a one-piece, angularly shaped structural component, whereby the support ring or its bearing surface (11) extend substantially parallel with the top zone (C) of the pneumatic cover (5).

6. The pneumatic suspension system according to claim 4, characterized in that the support ring (10') is a separate structural component with respect to the clamping ring (3), whereby a bearing surface (11') of the support ring extends substantially parallel with the top zone (C) of the pneumatic cover (5), with a flange-shaped widening (12) toward the median zone (B) of the pneumatic cover.

7. The pneumatic suspension system according to claim 4, characterized in that a free space (13, 13') is present between the support ring (10, 10') and the top zone (C) of the pneumatic cover (5).

8. The pneumatic suspension system according to claim 1, characterized in that the pleated structure bearing (7, 7', 7", 7'", 7"") has pockets (14), recesses facing the pleated structure (4), such pockets, recesses being arranged at regular spacings around the entire pleated structure bearing in the direction of the ring.

9. A pneumatic suspension system comprising:
   one pneumatic bellows (2) made of elastomeric material, said bellows being provided with reinforcing linings;
   one pneumatic cover (5) comprising: a bottom zone (A), on which a top end (2') of the pneumatic bellows (2) is secured by a clamping ring (3); a median zone (B); and a top zone (C) connected to a connecting component or a structural component (D) being integrated therein;
   one pneumatic piston (6) secured to a bottom end (2") of the pneumatic bellows (2) by a clamping ring (3'), wherein the pneumatic bellows can roll off on an external wall (6') of the pneumatic piston; and
   a pleated structure bearing (7, 7', 7", 7'", 7"") enclosing the pneumatic cover (5) within the median zone (B) and top zone (C) of said cover, said pleated structure bearing comprising a ring for elastically supporting a pleated structure (4) developing within the top zone of the pneumatic bellows (2), wherein the pleated structure bearing is supported on said structural component being a part element of the pneumatic cover, said connecting or structural component or an additional structural component.

10. The pneumatic suspension system according to claim 9, characterized in that the pleated structure bearing (7, 7', 7", 7'", 7"") consists of elastomeric material.

11. The pneumatic suspension system according to claim 10, characterized in that the elastomeric material consists of natural rubber (NR), ethylene-propylene-diene copolymer (EPDC), foam materials, or polyurethane foam.

12. The pneumatic suspension system according to claim 9, characterized in that the pleated structure bearing (7) is directly supported on a free underside (8') of the connecting component.

* * * * *